United States Patent
Borse et al.

(10) Patent No.: US 10,298,663 B2
(45) Date of Patent: May 21, 2019

(54) METHOD FOR ASSOCIATING PREVIOUSLY CREATED SOCIAL MEDIA DATA WITH AN INDIVIDUAL OR ENTITY

(71) Applicant: International Business Machines Corporation, Armonk, NY (US)

(72) Inventors: Santosh S. Borse, Ossining, NY (US); Ajay Raina, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 15/139,874

(22) Filed: Apr. 27, 2016

(65) Prior Publication Data

US 2017/0318077 A1 Nov. 2, 2017

(51) Int. Cl.
| | |
|---|---|
| G06F 15/16 | (2006.01) |
| H04L 29/08 | (2006.01) |
| G06K 9/00 | (2006.01) |
| G06F 16/23 | (2019.01) |
| G06F 16/2455 | (2019.01) |
| G06Q 50/00 | (2012.01) |

(52) U.S. Cl.
CPC .............. *H04L 67/10* (2013.01); *G06F 16/23* (2019.01); *G06F 16/2455* (2019.01); *G06K 9/00228* (2013.01); *G06K 9/00288* (2013.01); *G06Q 50/01* (2013.01); *H04L 67/306* (2013.01)

(58) Field of Classification Search
CPC ....... H04L 67/306; H04L 51/32; H04L 67/02; H04L 67/22; H04L 63/102; H04L 67/10; H04L 65/60; H04L 65/601; G06F 17/30867; G06F 17/30035
See application file for complete search history.

(56) References Cited

U.S. PATENT DOCUMENTS

| | | | | |
|---|---|---|---|---|
| 8,954,864 | B1* | 2/2015 | Thakkar | G06Q 10/107 715/739 |
| 2012/0158935 | A1* | 6/2012 | Kishimoto | G06Q 10/10 709/223 |
| 2012/0159350 | A1 | 6/2012 | Gaume | |
| 2012/0215705 | A1 | 8/2012 | Porro et al. | |
| 2012/0303652 | A1* | 11/2012 | Tseng | G06Q 30/02 707/769 |
| 2012/0317198 | A1* | 12/2012 | Patton | G06Q 10/10 709/204 |

(Continued)

OTHER PUBLICATIONS

Becker, H. et al., "Identifying Content for Planned Events Across Social Media Sites", WSDM'12 Proceedings of the Fifth ACM Inter. Conf. on, Feb. 8-12, 2012, pp. 533-542.

(Continued)

*Primary Examiner* — Michael A Keller
*Assistant Examiner* — Thao D Duong
(74) *Attorney, Agent, or Firm* — Scully, Scott, Murphy & Presser, P.C.; Kurt Goudy, Esq.

(57) ABSTRACT

The systems, apparatus, methods, and computer program products described herein allow a user to find published content that may be about the user on a social network by analyzing the user's profile information and social contact information to generate terms, face recognition data, contacts and other data, searching the contacts based on the generated terms, face recognition data, and other data and identifying content that may be about the user.

18 Claims, 7 Drawing Sheets

(56) References Cited

U.S. PATENT DOCUMENTS

| | | |
|---|---|---|
| 2013/0007667 A1 | 1/2013 | Sauve et al. |
| 2013/0046773 A1 | 2/2013 | Kannan et al. |
| 2013/0060869 A1* | 3/2013 | Davis .................. G06Q 10/107 709/206 |
| 2013/0212491 A1 | 8/2013 | Yerli |
| 2013/0340089 A1 | 12/2013 | Steinberg et al. |
| 2014/0310351 A1 | 10/2014 | Danielson et al. |
| 2014/0372898 A1 | 12/2014 | Ayres et al. |
| 2015/0026264 A1 | 1/2015 | McDonald et al. |
| 2015/0095417 A1 | 4/2015 | Chetuparambil et al. |
| 2015/0127558 A1 | 5/2015 | Erhart et al. |
| 2015/0207799 A1 | 7/2015 | Steiner et al. |
| 2015/0286662 A1 | 10/2015 | Marra et al. |
| 2015/0293916 A1 | 10/2015 | Paglia et al. |
| 2015/0341499 A1 | 11/2015 | Korsei et al. |

OTHER PUBLICATIONS

Wu, J. et al., "Providing Content-Related Snapshots for Current Sharing", IPCOM000235676, Mar. 19, 2014, pp. 1-8.

Ruben, W., "Introducing Moments: A Private Way to Share Photos with Friends", Jun. 15, 2015, pp. 1-4.

* cited by examiner

METHOD FOR ASSOCIATING PREVIOUSLY CREATED SOCIAL MEDIA DATA WITH AN INDIVIDUAL OR ENTITY

TECHNICAL FIELD

The present disclosure relates to systems, methods, and computer program products that provide a user with the ability to find and associate historical content about the user that is owned by others with the user's profile.

BACKGROUND

Social media provides users with ways of connecting and sharing content. Users of social media networks often post content about themselves and their lives on the social media network for others to view. For example, a user may post images, videos, text, or other content related to an event or activity that the user has participated in to the social media network to share that content with other users on the social media network.

BRIEF SUMMARY

The systems, apparatus, methods, and computer program products described herein allow a user to find previously published content that may be about the user by analyzing the user's profile information and social contact information to generate terms, face recognition data, contacts and other data, searching the contacts based on the generated terms, face recognition data, and other data and identifying content that may be about the user.

In an aspect of the present disclosure, a method is disclosed. The method includes determining that a user's information on a social network has been updated. The user's information may include profile information and social contact information of the user. The method further includes in response to determining that the user's information has been updated, receiving the user's profile information and social contact information from the social network, processing the user's profile information to identify one or more items of content that are about the user, processing the user's social contact information to determine a plurality of contacts associated with the user, and searching social media content associated with one or more of the plurality of contacts based on the identified items of content to identify additional content that may be about the user. The method further includes determining a confidence level that the additional content is about the user, comparing the confidence level that the additional content is about the user to a pre-determined threshold, determining based on the comparison that the confidence level is above the pre-determined threshold, and updating the user's profile information to include the additional content based at least in part on the determination that the confidence level is above the pre-determined threshold.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The system, method, and computer program product described herein may provide a user with the ability to identify content that may be about the user but is owned or published by others on a social media network, web site, or application, confirm that the content is about the user, and associate the content with the user on the user's profile. A user may include, for example, any person, entity, company, group, business, or any other user that may use or join a social network.

Figure 1:
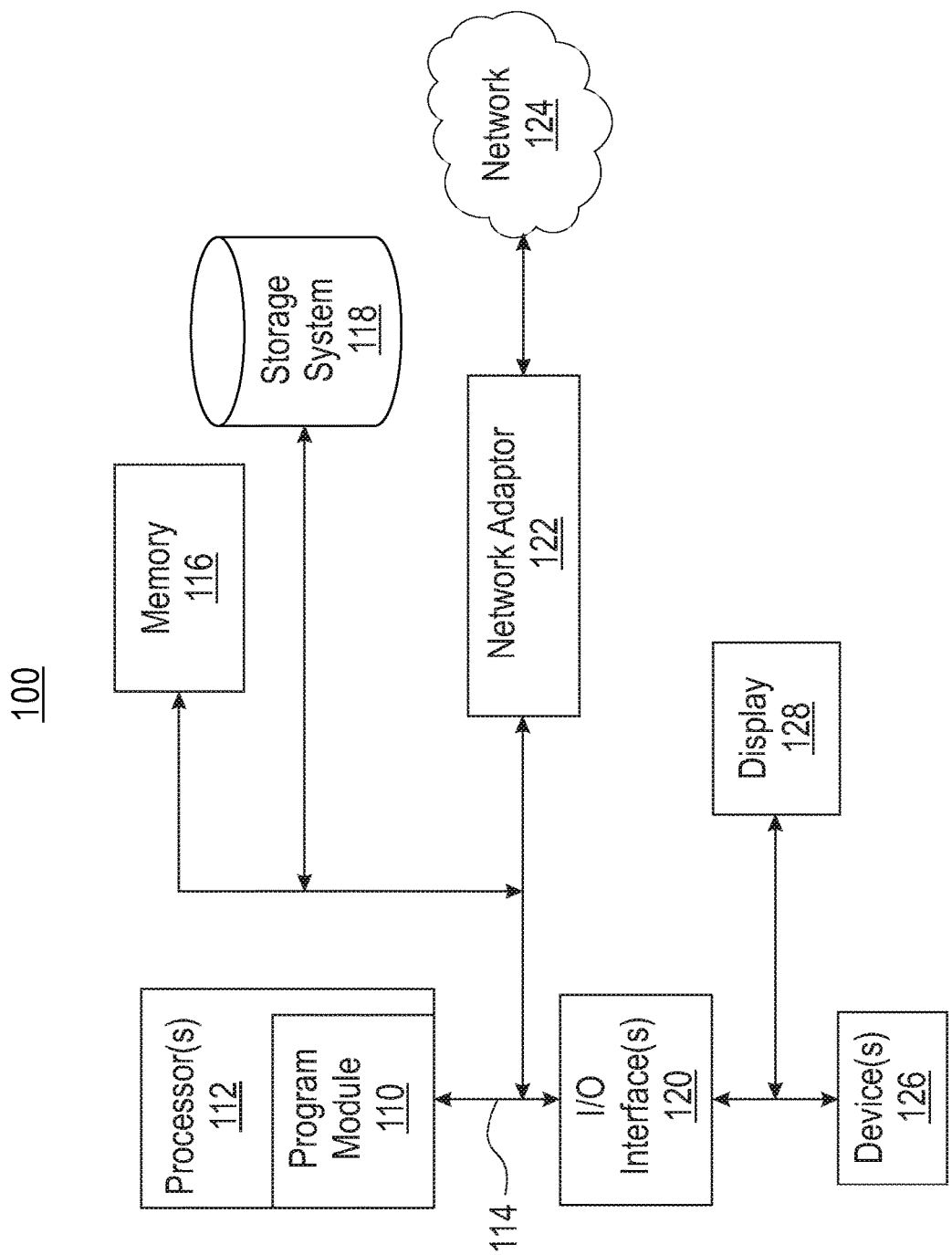
FIG. 1 is an exemplary block diagram of a computer system in which processes involved in the system, method, and computer program product described herein may be implemented.

FIG. 1 illustrates a schematic of an example computer or processing system 100 that may implement such a system in one embodiment of the present disclosure. The computer system 100 is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 100 may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system 100 may include, but are not limited to, one or more processors or processing units 112, a system memory 116, and a bus 114 that couples various system components including system memory 116 to processor 112. The processor 112 may include one or more program modules 110 that perform the methods described herein. The program modules 110 may be programmed into the integrated circuits of the processor 112, or loaded from memory 116, storage device 118, or network 124 or combinations thereof.

Bus 114 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 100 may include a variety of computer system readable media. Such media may be any available media that is accessible by computer system, and it may include both volatile and non-volatile media, removable and non-removable media.

System memory 116 can include computer system readable media in the form of volatile memory, such as random access memory (RAM) and/or cache memory or others. Computer system 100 may further include other removable/non-removable, volatile/non-volatile computer system storage media. By way of example only, storage system 118 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 114 by one or more data media interfaces.

Computer system 100 may also communicate with one or more external devices 126 such as a keyboard, a pointing device, a display 128, etc.; one or more devices that enable a user to interact with computer system 100; and/or any devices (e.g., network card, modem, etc.) that enable computer system to communicate with one or more other computing devices. Such communication can occur via Input/Output (I/O) interfaces 120.

Still yet, computer system 100 can communicate with one or more networks 124 such as a local area network (LAN), a general wide area network (WAN), and/or a public network (e.g., the Internet) via network adapter 122. As depicted, network adapter 122 communicates with the other components of computer system via bus 114. It should be understood that although not shown, other hardware and/or software components could be used in conjunction with computer system 100. Examples include, but are not limited to: microcode, device drivers, redundant processing units, external disk drive arrays, RAID systems, tape drives, and data archival storage systems, etc.

Figure 2:
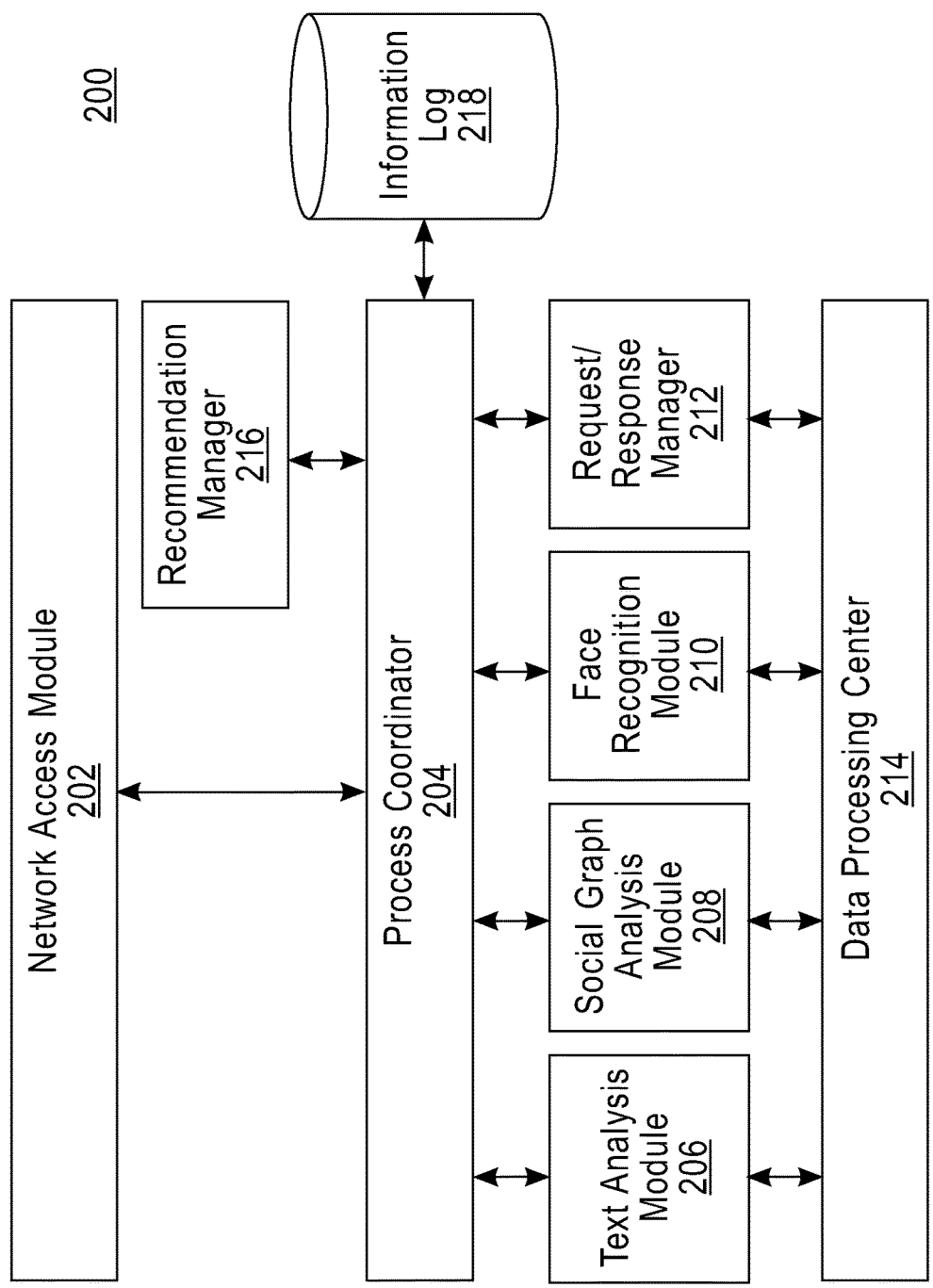
FIG. 2 is exemplary block diagram of functional components of the system according to an embodiment of the present disclosure.

The system of FIG. 1 may be configured to perform specific functions or execute specific modules as illustrated, for example, in the function diagram 200 of FIG. 2. Specific functions or modules may include but are not limited to, network access module 202, process coordinator 204, text analysis and name recognition module 206, social graph analysis module 208, face recognition module 210, request/response manager 212, data processing center 214, recommendation manager 216, and information log 218.

Network access module 202 may include social network applications (APIs) or any other systems for accessing social network data including, for example, applications on mobile devices, personal computers, laptops, tablets, smart devices, smart watches, smart wearable technology, or any other computing device capable of interfacing with a social network. In some embodiments, network access module 202 may include web browsers, web sites, or other similar tools for accessing a social network. Network module 202 may access the social network via a wired or wireless system, via the internet, and/or via any other communication system. In some embodiments, network access module 202 may provide access to data on a social network without actually logging in to the social network.

Process coordinator 204 coordinates the communication and collaboration between network access module 202, text analysis and name recognition module 206, social graph analysis module 208, face recognition module 210, request/response manager 212, recommendation manager 216, and information log 218.

Text analysis module 206 is configured to analyze textual data to identify terms or other content related to a user of system 100. For example, text analysis module 206 may receive profile information and other social media content including, for example, profile text, post text, tags, metadata, and other textual information, process the social media content to identify terms or other content, and provide the identified terms or other content to process coordinator 204 for storing in information log 218 and for further use by modules 206, 208, 210, and 212. For example, text analysis module 206 may utilize string matching software to search profile information for relevant terms or content. In some embodiments, text analysis module 206 may include relational matching processes that expand the scope of a matching term, for example, the term boy or son may be associated with the user if the term was used by a contact having an appropriate relationship with the user, e.g., the user's father or mother. In some embodiments, the profile information may include profile information of a user of system 100. In some embodiments the profile information may include profile information of another user of a social network. For example, the profile information of a contact associated with the user of system 100 on the social network may be analyzed. Example tools that may be used by text analysis module 206 for text analysis include, for example, IBM SPSS® and Apache Open NLP™.

Social graph analysis module 208 generates an analysis of a user's social graph on a social network. For example, in some embodiments social graph analysis module 208 may receive or retrieve social contact information of the user from the social network, for example, via network access module 202 and generate a social graph for the user from the social contact information. In some embodiments, the social contact information includes the social graph. The social contact information may include, for example, names or identifiers associated with contacts of the user. The contacts may include, for example, any person, entity, or otherwise that is associated with the user. The contact may be associated with the user on the social network via one or more features of the social network, for example, a friend feature that allows a user to add a contact to a list of contacts that may be associated with the user's profile information, a follow feature that allows the user to track the social network activity of a particular contact, a like feature that allows the user to show an interest in content published by a particular contact, or other similar connections. In addition, social contact information for the user may also include the social contact information of any contact that is associated with the user. For example, the social contact information of a friend on the user's friend list.

Social graph analysis module 208 may analyze the social graph to determine one or more contacts that may require further analysis by text analysis module 206, face recognition module 210, or any other function/module of system 100. For example, social graph analysis module 208 may assign a weighting or relevance value to each contact in the user's social graph, may sort or group contacts from the user's social graph together, or may perform other similar analyses. For example, social analysis module 208 may group relatives of the user in a first group, direct friends, e.g., in the user's friends list, of the user in a second group, and friends of friends in a third group. As another example, social analysis module 208 may group contacts together based on a number of times that the user has liked content published by those contacts, e.g., contacts that have had their content liked by the user greater than 50 times may be in a first group, contacts that have had their content liked by the user between 25 and 50 times may be in a second group, etc. In some embodiments, each group or each contact may be assigned a relevance value such that only those groups or contacts having a higher relevance than a threshold value may be searched by system 100. In some embodiments, the number of contacts searched may be based on the availability of computing power and the frequency that social analysis module is executed. In some embodiments, for example, it is possible that every contact in the user's social graph may be searched. In some embodiments, for example, it even possible that every profile on the social network may be searched.

Figure 3:
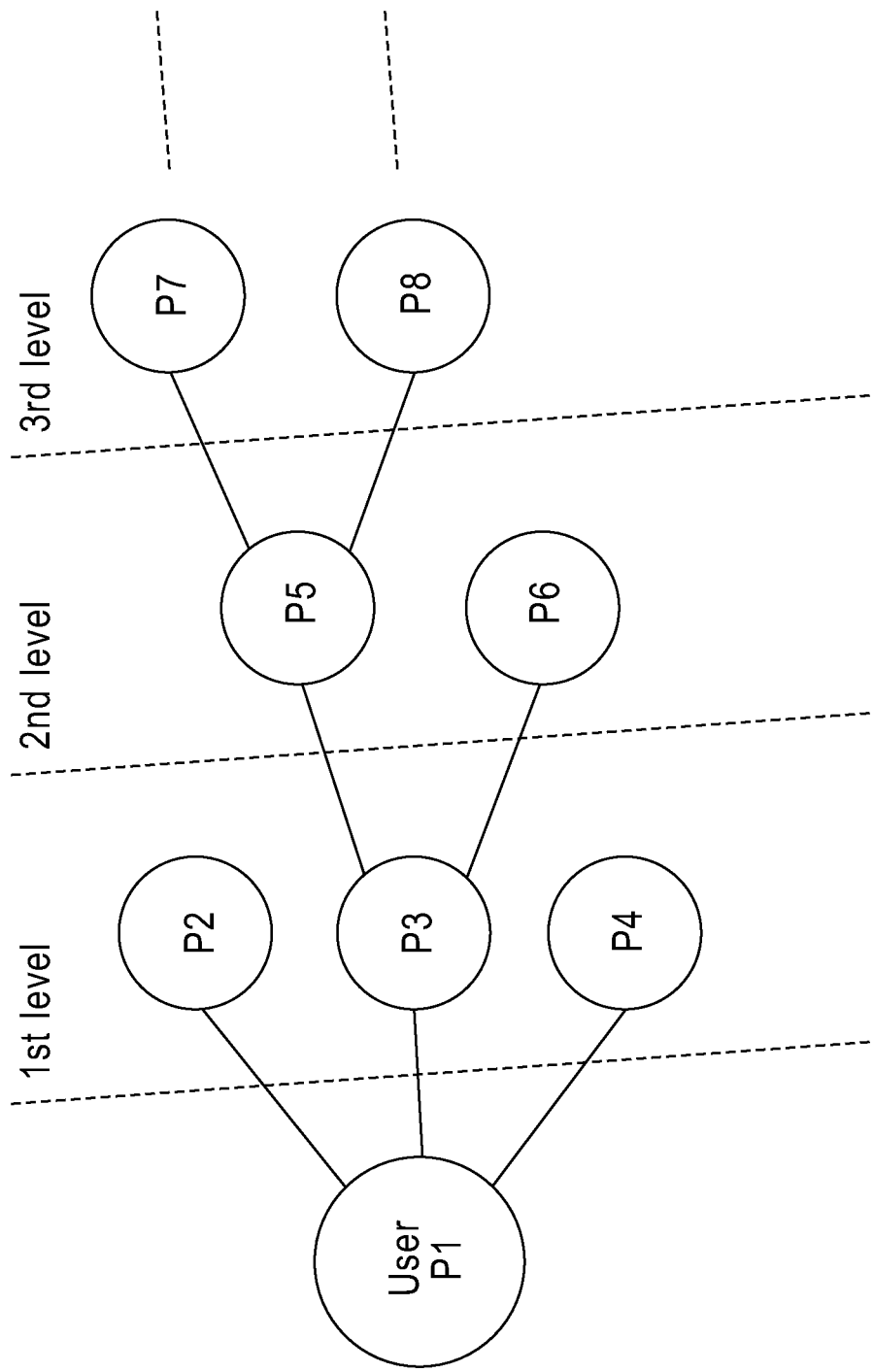
FIG. 3 is an example of a social graph according to an embodiment of the present disclosure.

In some embodiments, social graph analysis module 208 may determine which groups or contacts will be further searched by modules 206, 210, and 212. In some embodiments, contacts may be grouped into levels for searching as illustrated, for example, in FIG. 3. Referring now to FIG. 3, a user P1 may have a social graph including contacts P2, P3, and P4 in a first level, P5 and P6 in a second level, P7, and P8 in a third level, etc. The levels may be defined, for example, as described above based on relationship (relatives, friends, friends of friends, friends of friends of friends, etc.), or on any other similar relationship. As illustrated in FIG. 3, for example, contacts P2, P3, and P4 on the first level may be direct contacts of user P1. Contacts P5 and P6 on the second level may be direct contacts of P3 and indirect contacts of user P1 via P3. Contacts P7 and P8 on the third level may be direct contacts of P5, indirect contacts of P3 via P5, and indirect contacts of user P1 via P3 via P5.

In some embodiments, the number of levels to be searched or analyzed may be pre-defined by system 100. In some embodiments, the number of levels to be searched or analyzed may be adjusted by system 100. For example, the system may adjust the number of levels to be searched or analyzed based on an availability of processing resources, a frequency of searching, or other similar considerations. In some embodiments, a user of system 100 may input or select a level of searching that is desired, for example, only relatives, only friends on the friends list, only those contacts with content that has been liked more than a certain amount, any other level of searching, or any combination thereof. In some embodiments searching or analyzing the second level may include searching or analyzing the first level; searching or analyzing the third level may include searching or analyzing the first and second levels, etc. In some embodiments, each level may selected individually for searching or analysis without including a search of any prior level. In some embodiments, every profile on a given social network may be searched or analyzed including those profiles that are not found in any level of the user's social graph. A list of contacts to be searched may be provided by social graph analysis module 208 to process coordinator 204 for storage in information log 218 and for further use by text analysis module 206, face recognition module 210 and request/response manager 212. Social graph analysis module 208 may, for example, include the use of custom Java code or readily available libraries including network analysis packages such as igraph™, or other similar tools.

Text analysis module 206 may analyze profile information and content published by each contact in the list of contacts to be searched for information that may be about the user. For example, text analysis module 206 may use the terms or content generated from the user's profile information and stored in information log 218 when analyzing the profile information and content published by each contact to determine if the contact includes content that may be about the user. In some embodiments, text analysis module 206 may also use the terms or content generated from the user's profile information and stored in information log 218 when analyzing the profile information and content published by other users of the social media network including those who are not contacts of the user in the user's social graph. In another example, text analysis module 206 in conjunction with social graph analysis module 208 may analyze a contact on the list of contacts to determine a relationship between the user and the contact. For example, text analysis module 206 may determine whether the contact belongs to the same family as the user (e.g. a relative), lived at the same place, town, city, state as the contact either currently or in the past, whether the contact includes other contacts in that are in common with contacts of the user, whether the contact and the user attended the same schools, colleges, or other institutions either separately or at the same time, where the contact worked or currently works and whether the user and the contact both worked or currently work in the same location, area, town, city, state, etc., whether the contact and the user worked or currently work for the same employer, whether the contact and the user belonged or currently belong to the same online group or community, or any other relationship.

In some embodiments, text analysis module 206 in conjunction with social graph analysis module 208 may analyze text, tags, metadata, or mentions in published content to determine, for example, what contacts if any are tagged or identified in the content, whether the tagged or identified contact is in the user's social graph either directly on the user's friends (list, liked, followed, etc.) or indirectly via other contacts, and whether a location of the published content has been provided, e.g., where an image was taken, where an event depicted in the content is occurring or has occurred, etc.

In some embodiments text analysis module 206 in conjunction with social graph analysis module 208 may analyze the published content to determine, for example, whether there is any direct reference to the user's name, e.g., first name, middle name, last name, nickname, etc., whether there is any direct reference to another name identified in information log 218, e.g., the name of a relevant contact, whether there is any indirect matching relationships, e.g., references to mom, dad, father, mother, daughter, son, nephew, niece, grandson, granddaughter, grandfather, grandmother, etc.

Face recognition module 210 is configured to analyze images, videos or other digital content using facial recognition algorithms to generate face recognition data. For example, images, videos, or other content about the user that the user has published in his or her profile may be analyzed by face recognition module 210 to generate face recognition data for the user. The face recognition data may be catalogued by face recognition module 210 based on data associated with the image, video, or other content including, for example, a date that the image, video, or other content was taken, any text, tags, metadata, or other similar data associated with the image, video or other content, or any other information associated with the image, video, or other content. The face recognition data may be provided to process coordinator 204 by face recognition module 210 and stored in information log 218. In some embodiments, the user may publish an image including the user from when the user was younger. Face recognition module 210 may also generate face recognition data from this image and catalogue the face recognition data according to an estimated date of when the image was taken, for example, by using additional information associated with the image. As an example, text analysis module 206 may be used to analyze text associated with the publishing of the image to provide face recognition module 210 with a context for cataloging the image. For example, if the user published the image with a caption stating "Can't believe what I looked like when I was 10 years old," text analysis module 206 may analyze the caption to determine that the image was taken when the user was 10 years old. Text analysis module 206 may then provide this information to process coordinator 204 for combination with the face recognition data, and other profile information of the user, for example, the user's date of birth, to allow the face recognition data to be catalogued in information log 218 as being from the year when the user was 10 years old.

Face recognition module 210 may also analyze content published by other contacts associated with the user. For example, face recognition module 210 may analyze content published by contacts identified by social graph analysis module as being in the list of contacts to be searched. The content may be analyzed by face recognition module 210 to generate face recognition data that may be compared to the face recognition data of the user stored in information log 218. For example, if a contact on the list of contacts to be searched published an image, face recognition module 210 may analyze the image to generate face recognition data for the image, compare the face recognition data for the image to the face recognition data of the user stored in the information log 218, and if the face recognition data substantially matches the face recognition data of the user, determine that the image may be about the user. If it is determined that the image may be about the user, the image may be provided to recommendation manager 216 for further processing.

In some embodiments, face recognition module 210 may also generate face recognition data about other individuals in an image published by the user. The face recognition data about the other individuals may also be provided to process coordinator 204 and information log 218. Social graph analysis module 208 may use the face recognition data about the other individuals to assist in determining which contacts to add to the list of contacts to be searched. For example, face recognition module 210 may, in conjunction with the social graph analysis performed by social graph analysis module 208, analyze a profile image associated with each contact from the social graph to generate face recognition data about each contact. The face recognition contact from the other individual in the image may be compared to the face recognition data about each contact generated from the contact's profile image to determine if there is a match between a contact and the individual in the image. If there is a match, the contact may be added to the list of contacts to be searched based on the match. Face recognition module 210 may, for example, use tools or libraries including OpenBR, OpenCV, or other similar tools.

In some embodiments, text analysis module 206 and face recognition module 210 may be used together to determine if there is content that may be about the user. For example, if an image or video is published by a contact with an accompanying textual statement, text analysis module 206 may analyze the textual statement for terms or other information that may be about the user while face recognition module 210 may analyze the image or video to generate face recognition data that may be compared to the face recognition data of the user. If such terms are found or the face recognition data generated by face recognition module 210 matches face recognition data about the user stored in information log 218, the image or video, face recognition data, and/or terms may be provided to process coordinator 204 for storage in information log 218. The image or video may be categorized based on the terms used in the textual statement. As an example, if the user's mother is a contact on the list of contacts to be searched, and she published an image with a textual statement, for example, "my son is 10 years old today," text analysis module 206 may analyze the text "my son is 10 years old today" to determine that the image may be an image of the user. Face recognition module 210 may then analyze the image to generate face recognition data that may be about the user when the user was ten years old. The face recognition data may be stored in information log 218 for confirmation and may be compared images or videos published by other contacts such that system 100 may find additional images or videos that may be about the user when the user was at or around ten years old. In some embodiments, text analysis module 206 or face recognition module 210 may also analyze additional data about the published image or video including, for example, text, tags, metadata, or other similar data associated with the published image or video that identify who is in the published image or video, text and/or tags associated with the published image or video that identify when the published image or video was taken, the date that the image or video was published to assist in determining when the image was taken, embedded data in the published image or video identifying the date and/or location where the image or video was taken, or any other data that may be determined based on the published image or video.

Request/response manager 212 is configured to send confirmation and permission requests to the contacts that own content that may be about the user. For example, when an item of content, e.g., text, image, video, etc., has been identified by text analysis module 206 or face recognition module 210 as possibly being about the user, a confirmation message may be sent to an owner or publisher of the item of content requesting confirmation that the item of content is actually about the user. In some embodiments the message may also or alternatively be sent to the user for confirmation that the content is about the user. Once the item of content has been confirmed to be about the user, the request/response manager 212 may send a request to the owner of the content for permission to associate the content with the user, for example, on the user's profile. In some embodiments, request/response manager 212 may automatically send the confirmation message and requests for permission to the user and/or owner/publisher of the item of content. In some embodiments, request/response manager 212 may provide the user with an indication that a confirmation message or request for permission is ready to be sent and may require the user to confirm the indication before sending.

Referring to FIG. 2, data processing tool 214 may be, for example, a distributed processing system that is configured to facilitate the processing performed by system 100. Some examples of data processing tools may include, for example, Hadoop®, IBM Biginsights®, or other similar data processing tools. For example, the processing performed by text analysis module 206, social graph analysis module 208, and face recognition module 210 may be highly resource intensive with exponentially increasing complexity as new contacts, terms, or content are identified for searching and analysis. For example, as each new contact is added to the user's list of friends or associated with the user in any other manner, e.g., likes, follows, etc., new or additional analyses must be performed by each of text analysis module 206, social graph analysis module 208 and face recognition module 210 on the published content of the new contact. As new content that may be about the user is identified, additional analyses based on the new content is performed on any other contacts that may have been previously searched to determine whether the new content triggers an association with previously analyzed content such that the previously analyzed content may be identified as possibly being about the user and stored in information log 118. Similarly, as new textual content is analyzed, textual content from previously analyzed contacts may become more relevant to the user such that, for example, an image or other content from the previously analyzed contact may be determined to be possibly about the user.

Recommendation manager 216 is configured to make a determination on whether an item of content that was identified by text analysis module 206, social graph analysis module 208, or face recognition module 210, as possibly being about the user is sufficiently relevant to the user to require sending a request for confirmation by request/response manager 212. For example, recommendation manager 216 may receive the item of content from information log 218 and may receive additional data from information log 218 related to the content to determine a confidence level that the item of content is about the user. For example, each item of identified content may have a pre-determined baseline confidence level. The confidence level may be increased based on a variety of factors including a context of how the content was identified, correspondences between text, images, videos or other information related to the content, a relationship of the user to the owner of the content or the contact that published the content, or any other connection to the content. For example, an item of content may have been identified by text analysis module 206 as possibly being about the user and may be given a baseline confidence level by recommendation manager 216 of 25%.

In some embodiments, the confidence level may be increased by a set amount for each additional factor or connection. For example, if the user has a familial relationship to the publisher of the content, e.g., mother, father, brother, etc. the confidence level of 25% may be increased by 25% for a total of 50%. In some embodiments, for example, if the user's name information, e.g., first name, last name, etc., is found in an item of content published by a direct network contact of the user the item of content may have a 50% higher confidence level than if the name was found in an item of content published by an indirect contact. In some embodiments an indirect reference to the user, e.g., son, daughter, etc., may have lower confidence level than a direct name match, for example, 25% lower than the same match having the direct name. In some embodiments, an indirect reference to the user in combination with a face recognition data match may have a higher confidence level than the indirect reference to the user without the face recognition data match. For example, an indirect reference with face recognition match may have a confidence level of 75% while the indirect reference alone may only have a confidence level of 25%.

In some embodiments, a percentage of a match between face recognition data of an item of content and face recognition data of the user may be correlated. For example, if there is an 80% match between the face recognition data of the item of content and the face recognition data of the user, the confidence level may also be 80%. In some embodiments, for example, if increase in the confidence level based on a match between face recognition data is limited to 50%, the 80% match may increase the confidence level by 80% of the limit, i.e., 40%.

In another example, if in addition to the familial relationship, e.g., mother, the content was identified based a textual connection, e.g., "my son is 10 years old" referring to an image of a 10 year old boy, the confidence level of 25% that the image of the 10 year old boy is about the user may be increased by 25% for the familial relationship and 25% for the textual connection for a total of 75%. In some embodiments, for example, the confidence level may be increased 10% for the familial relationship and 25% for the textual connection. Although examples amounts of increasing the confidence level are provided, it is contemplated that larger or smaller amounts of increase may be used for each additional factor or connection. For example, in some embodiments system 100 may include pre-determined increase values based on a type of the factor or connection. In some embodiments, the increase values for each type of factor or connection may be set or adjusted by a user of system 100. In some embodiments, the confidence level may be increased proportionally to the confidence levels of the additional factors or connections. For example, additional factors or connections having higher confidence levels may increase the confidence level of the item of content by a greater amount than additional factors or connections having lower confidence levels. In some embodiments, as the confidence levels of the additional factors or connections change, the confidence level of the item of content may also change.

In some embodiments, recommendations made by recommendation manager 216 may be stored in information log 218. Recommendation manager may analyze historical recommendations stored in information log 218 and may increase or decrease the confidence levels of related items of content based on which recommendations were accepted or rejected by user. For example, each successful match (accepted by user) from past will increase the confidence level by 10% and each unsuccessful match (rejected by user) from past will decrease the confidence level by 5%, etc.

In some embodiments, recommendation manager 216 may be trained using machine learning to set confidence levels for new content. For example, the content, data and information generated by text analysis module 206, social graph analysis module 208 and face recognition module 210 and stored in information log 218 may be used to generate training samples to train recommendation manager 216. In some embodiments, for example, content determined to not be about the user may be used to generate training samples to train recommendation manager 216 for what content to disregard. Likewise, content determined to be about the user may be used to generate training samples to train recommendation manager 216 for what content to consider. In addition, content confirmed to be about the user may generate additional training samples, for example, X amount of training samples per confirmed content, that may be used to further train recommendation manager 216. In some non-limiting examples, X may be an integer value, for example, 5, 10, 15, etc. Still further, content that has been both confirmed and for which permission has been received to be added to the users profile information may generate, for example, Y amount of training samples per confirmed and permissioned content. In some non-limiting examples, Y may be an integer value, for example, 5, 10, 15, etc. In some embodiments, Y may always be greater than X to signify that the content has been both confirmed and permissioned instead of just confirmed. Based on the training samples, recommendation manager 216 may generate a confidence level for an item of content. For example, when factors related to the item of content match a large number of positive training samples, a high confidence level, e.g., 70%, 80%, etc., may be generated for the item of content. In another example, when factors related to the item of content match negative training samples, e.g., training samples for content found to not be about the user, a low confidence level, e.g., 30%, 20%, etc., may be generated for the item of content.

Once a confidence level for an item of content has been determined by recommendation manager 216, recommendation manager 216 may compare the confidence level to a pre-determined threshold to determine if request/response manager 212 should send a request for confirmation to an owner or publisher of the content or to the user. For example, the pre-determined threshold may be 50%, 75%, 90%, or any other value against which the confidence level may be compared. The pre-determined threshold may be a system setting, set or adjusted by a user of system 100, or set in any other manner. The result of the comparison may also be stored in information log 218.

If recommendation manager 216 determines that the confidence level is greater than or equal to the pre-determined threshold level, recommendation manager 216 may provide process coordinator 204 with an indication that request/response manager 212 should send out a request for confirmation. If recommendation manager 216 determines that the confidence level is less than the pre-determined threshold level, the confidence level associated with the item of content may be stored for later use. For example, as new items of content are analyzed or identified by text analysis module 206, social graph analysis module 208, and/or face recognition module 210, new connections or other factors associated with the item of content may be identified. Recommendation manager 216 may increase the stored confidence level associated with the item of content based on the new connections or other factors. Once the stored confidence level increases to or above the pre-determined threshold, recommendation manager 216 may trigger request/response manager 212 to send a request for confirmation to the owner/publisher of the content or to the user of system 110. In some embodiments no request for confirmation may be sent to the owner/publisher, for example, where the content may be public content, no restriction on use of the content is present, the content is not owned by a user of the social media network, the social media network's terms and condition provide for associating or sharing content without further permissions, or other similar circumstances. In these cases, should the user determine that the content is about the user, the content may automatically be associated with user's profile by system 100.

After sending a request for confirmation, request/response manager 212 may wait to receive an indication from the owner/publisher of the content or the user confirming whether or not the content is about the user. For example, if the request/response manager 212 receives an indication that the item of content is not about the user, this information may be provided to process coordinator 204 for storage in information log 218. In some embodiments, the confidence level for the item of content may also be set to 0%, for example, indicating that the item of content is confirmed to not be about the user. In addition, other data that may be based on or have connection to the item of content may also be affected. For example, if the item of content is an image that may have been about the user, and confirmation is received that the image is not about the user, the confidence levels for other content items that are associated with the image may be reduced. In some embodiments, for example, if the other content items included an increase in confidence level based on the association with the image, that increase may be removed. In some embodiments, association with an image confirmed to not be about the user may act to reduce the confidence level from the baseline confidence level.

As another example, if the request/response manager 212 receives a confirmation that the item of content is about the user from the owner/publisher of the content or the user, this information may also be provided to process coordinator 204 for storage in information log 218. In some embodiments, the confidence level for the item of content may also be set to 100%, for example, indicating that the item of content is confirmed to be about the user. In addition, other data that may be based on or have connection to the item of content may also be affected. For example, if the item of content is an image that may have been about the user, and confirmation is received that the image is about the user, the confidence levels for other content items that are associated with the image may be increased. In some embodiments, association with an image confirmed to be about the user may act to increase the confidence level of an item of content.

When an item of content is confirmed to be about the user, request/response manager 212 may send a request to the publisher/owner of the content for permission to publish or associate the item of content with the user on the user's profile. In some embodiments, request/response manager 212 may first send a request to the user for confirmation that the user wishes to publish or associate the item of content with the user on the user's profile. If, in response to the request for permission, request/response manager 212 receives a denial of permission to publish or associate the item of content with the user, the denial may be stored in information log 218 to indicate that the item of content may not be published or associated with the user. Request/response manager 212 may send the user an indication that the request for permission has been denied by the publisher/owner of the content.

If, in response to the request for permission, request/response manager 212 receives permission to publish or associate the item of content with the user, the permission may be stored in information log 218 and response/request manager 212 may send the user an indication that permission has been received from the publisher/owner of the content. Process coordinator 204 or system 100 may then publish or associate the item of content with the user's profile. In some embodiments, the user may alternatively publish or associate the item of content with the user's profile with no further input from system 100. Once the item of content has been published or associated with the user's profile, system 100 may once again analyze the user's profile and social contact information in the manner described above to iteratively identify additional content that may be about the user.

In some embodiments, no confirmation that the content is about the user may be required. For example, if recommendation manager 216 determines that the confidence level that an item of content is about the user is greater than or equal to the pre-determined threshold, process coordinator 204 may automatically associate the content with the user's profile or may automatically have request/response manager 212 to request permission to associate the content with the user on the user's profile. In some embodiments no permission may be required where, for example, if recommendation manager 216 determines that the confidence level that an item of content is about the user is greater than or equal to the pre-determined threshold the item of content may be automatically associated with the user on the users profile without any request for confirmation or permission being sent.

In some embodiments, the user may review confirmed or unconfirmed matches to determine whether the user wants to associate the items of content with the user's profile. If the user accepts an item of content for association, all subsequent matches with related items of content may receive a set increase to their confidence levels, for example a 20% increase. In some embodiments if a user rejection the item of content for association, even if the content was found to possibly be about the user, confirmed to be about the user, or has a high confidence level that the item of content was about the user, all subsequent matches related to the item of content may receive a set decrease to their confidence levels, for example a 20% decrease.

Information log 218 may be a database or any other kind of data structure that is configured to store information about the user, the user's profile information, the user's social contact information, analysis data from any of modules 206, 208, and 210, data related to requests for confirmation or permission sent by request/response manager 212, data related to confidence levels of content as identified by recommendation manager 216, or any other data related to system 100. Information log 218 may be stored in memory 116, in storage system 118, in the cloud, or in any other location. Information may be stored in information log 218 based on one or more categories to allow for ease of searching. In some embodiments, information log may include categories such as, for example, profile type (e.g., person, company, restaurant, café, store, library etc.), gender (e.g., M or F), past lived location (e.g., location with corresponding dates), current location, names (e.g., first name, middle name, last name, short name, nicknames, etc.), images or videos (e.g., images or videos that have been added to information log), scan history (e.g., data about any analysis/scanning by modules 206, 208, 210 212, and 216 including dates scanned and results), and recommendations (e.g., information about items of content that were recommended to be about the user including the outcome of the recommendation, e.g., accepted, rejected, etc.).

Information log may store, for example, profile attributes including the name, gender, age, ethnicity, and geographic location of the user or a contact. Information log may also or alternatively store, for example, a date when the user joined a particular social media site. Information log may also or alternatively store, for example, face recognition data of the user and/or other contacts. Information log may also or alternatively store, for example, images and video content found to be potentially about the user. Information log may also or alternatively store, for example, additional contextual information about any stored images or videos including, for example, the date the image or video was taken, the date the image or video was published, names or other terms associated with the image or video, contacts or persons identified to be in the image or video, or other similar information. Information log may also or alternatively store, for example, information about the user or other contacts including, for example, schools, colleges, or institutions attended, dates of attendance, past locations, current locations, past employers, current employers, past work locations, current work locations, and other similar information. Information log may also or alternatively store, for example, entity information for entities that the user has friended, followed, liked, etc. including, for example, type of entity, the main attraction of the entity, the address or location of the entity, the user's relation to the entity, or any other similar information. Any items of content that have been accepted by the user for publishing or associating with the user's profile may also be stored in the information log 218 with an indication that the item of content has been accepted.

Figure 4:
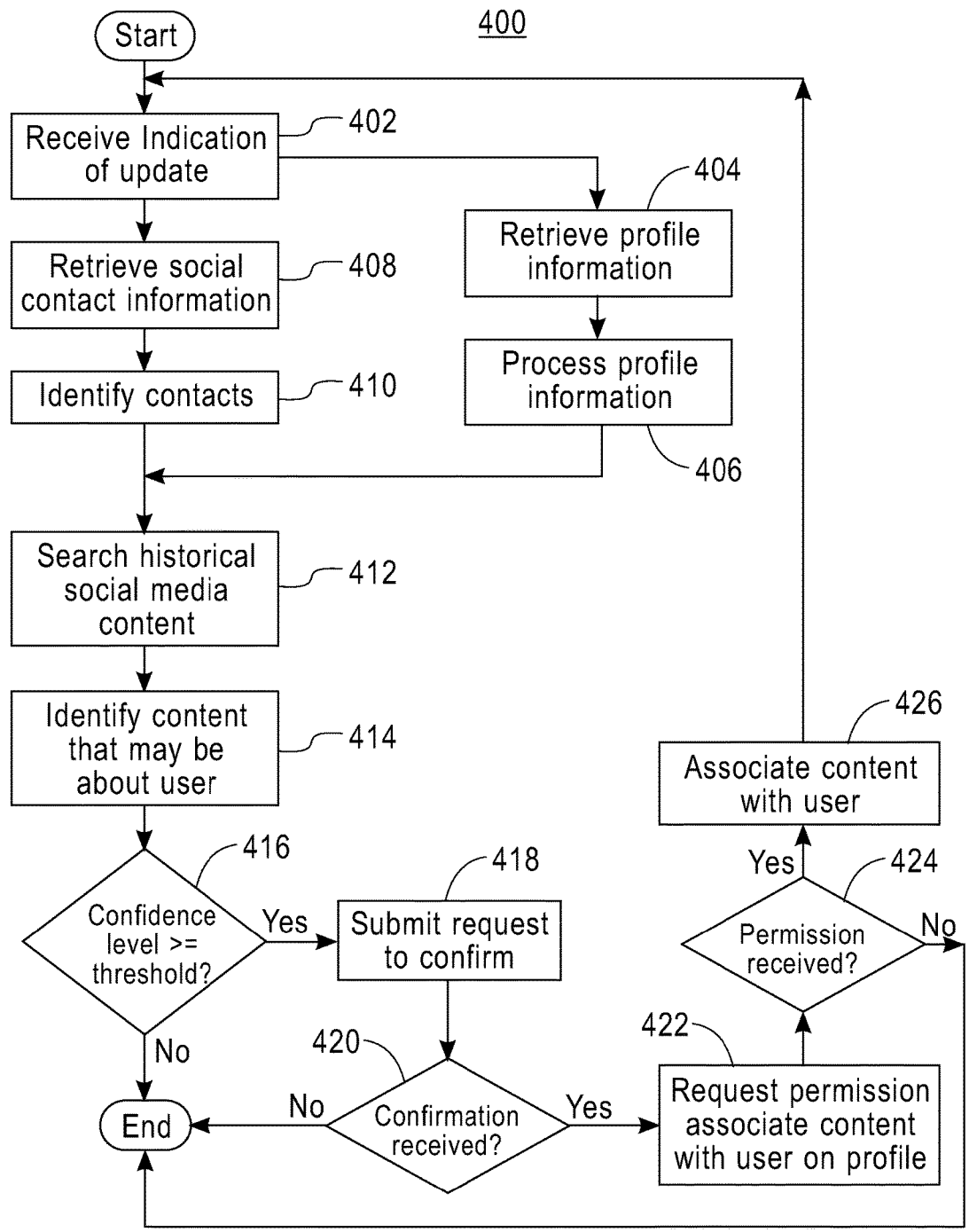
FIG. 4 is a flow chart of a method according to an embodiment of the present disclosure.

Referring now to FIG. 4, a method 400 in accordance with an embodiment of the present disclosure is disclosed. At 402, an indication is received by network access module 202 that an update to a user's information on a social network has occurred. For example, the user has joined the social media, user may have updated the user's profile, may have added a contact, liked published content, followed a contact, or any other update. In some embodiments, the indication may be received directly from the user, for example, by the user activating an application to execute system 100. In some embodiments, the act of updating the user's information may trigger a sending of the indication to system 100. In some embodiments, system 100 may poll the social network for updates to the user's information. In some embodiments, network access module 202 may provide the received indication to process coordinator 204.

At 404, process coordinator 204 retrieves the user's profile information from the social network, for example via network access module 202, and sends user's profile information to text analysis module 206 and/or face recognition module 210 for analysis and processing.

At 406, text analysis module 206 and/or face recognition module 210 analyze the user's profile information as described above to generate terms, face recognition data, and other content related data for use in searching the published content of other contacts. The generated terms, face recognition data, and other related data may be stored in information log 218.

At 408, process coordinator 204 retrieves the user's social contact information from the social network, for example via network access module 202, and sends the user's social contact information to social graph analysis module 208.

At 410, social graph analysis module 210 analyzes the user's social contact information as described above to identify a list of contacts for searching. For example, social graph analysis module 210 may identify contacts from any of the $1^{st}$ level of contacts to the Nth level of contacts for further searching. Social graph analysis module 210 may also or alternatively identify contacts that are not in the user's social graph for searching based on the considerations mentioned above including, for example, available processing resources, frequency of searching, or other similar considerations. Processes 404, 406, 408, and 410 may be performed in series or in parallel.

At 412, text analysis module 206 and face recognition module 210 search and analyze historical content, e.g., content published prior to the update to the user's information on the social network, associated with each contact in the list of contacts based on the generated terms, face recognition data, and other content related data stored in information log 218.

At 414, text analysis module 206 and face recognition module 210 identify one or more items of content that may be about the user based on the search and analysis and send the one or more items of content to recommendation manager 216. Recommendation manager 216 may determine a confidence level for each item of content in the manner described above.

At 416, the confidence level for each item of content is compared to the pre-determined threshold as described above.

If the confidence level of an item of content is greater than or equal to the pre-determined threshold, request/response manager 212 submits a request for confirmation that the content is about the user to at least one of a publisher/owner of the content and the user at 418. Alternatively, if the confidence level of an item of content is less than the pre-determined threshold, no further action is taken on the item of content at this time. In some embodiments, the item of content may be compared to the threshold again if a change in the confidence level is detected, for example, due to a change or addition to one or more other items of content related to the item of content.

At 420, request/response manager 212 determines whether or not confirmation that the content is or is not about the user has been received from the publisher/owner of the content or the user. If confirmation is received that the content is about the user, request/response manager 212 requests permission from the publisher/owner of the content to associate the content with the user's profile at 422. If confirmation is received that the content is not about the user, or if no response is received, no further action is taken on the item of content. In some embodiments, request/response manager 212 may send follow up requests if no response is received.

At 424, request/response manager 212 determines whether permission has been received from the publisher/owner of the content to associate the content with the user's profile. If permission has been received, process coordinator 204 associates the content with the user on the user's profile at 426. For example, process coordinator 204 may send an indication to the social network to make the association, may provide the user with the content for association, or may associate the content with the user in any other manner. If permission has not been received, or permission has been denied, no further action is taken. In some embodiments, request/response manager 212 may send follow up requests to the publisher/owner if no reply has been received.

Once the content has been associated with the user on the user's profile, method 400 may continue again to 402 for further analysis based on the new content having been associated with the user's profile. In this manner, system 100 may iteratively develop a log of terms, face recognition data, and other data for use in further matching to additional content that may be about the user. As each new item of content is associated with the user, the scope of the search and analysis may be expanded based on any new information found in the new item of content.

In some embodiments, the terms, face recognition data, and other data stored in information log 218 may be applied to other social networks. For example, based on a change to the user's profile in a first social network, information log 218 may be updated with new or additional terms, face recognition data, and other data using text analysis module 206, social graph analysis module 208 and face recognition module 210. The updated data from information log 218 may then be applied to a second social network that the user has joined to find additional content about the user. For example, text analysis module 206, social graph analysis module 208 and face recognition module 210 may analyze the user's profile information and social contact information on the second social network to find content that may be about the user based on the updated data stored in information log 218. In this manner, content updates in one social network may be used to gather additional content that may be about the user for any other social network, thereby expanding the user's ability to locate content that may be about the user beyond a single social media platform.

Figure 5:
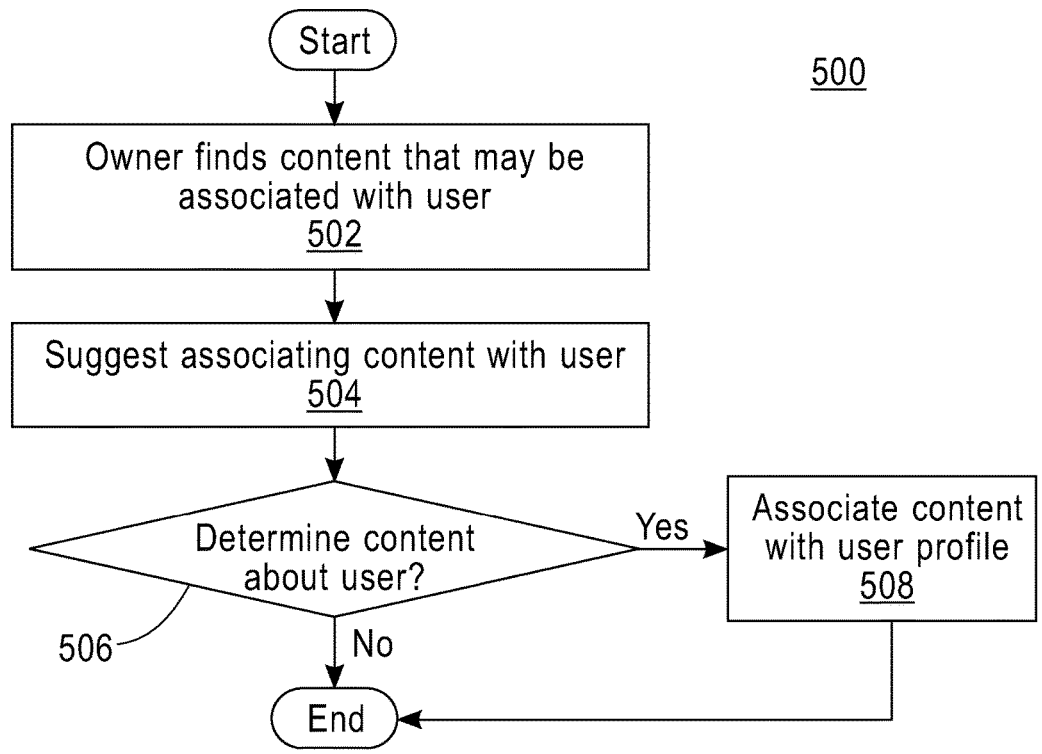
FIG. 5 is a flow chart of a method according to an embodiment of the present disclosure.

In some embodiments, a publisher/owner of content may also provide system 100 with content that may be about the user as illustrated, for example in FIG. 5. FIG. 5 provides a method 500 of a contact suggesting content to a user. At 502, the contact identifies content that may be about the user. For example, the contact may be the publisher/owner of content or the contact may find the content on another profile in the social network.

At 504, the contact sends a suggestion to system 100 that the content may be about the user.

At 506, system 100 analyzes the content using any of the features described in functional diagram 200 above to determine whether the content is about the user, receive confirmation on whether or not the content is about the user, and receive permission to associate the content with the user on the user's profile. In some embodiments, the confidence level that the content is about the user may be increased due to the fact that the content was suggested by another contact.

If the content is determined to be about the user, confirmed to be about the user, and permission is received, the user profile is updated to include the content at 508. If the content is determined to not be about the user, the content is not confirmed to be about the user, permission is denied, or the user does not wish to include the content in the user profile, no further action is taken.

Figure 6:
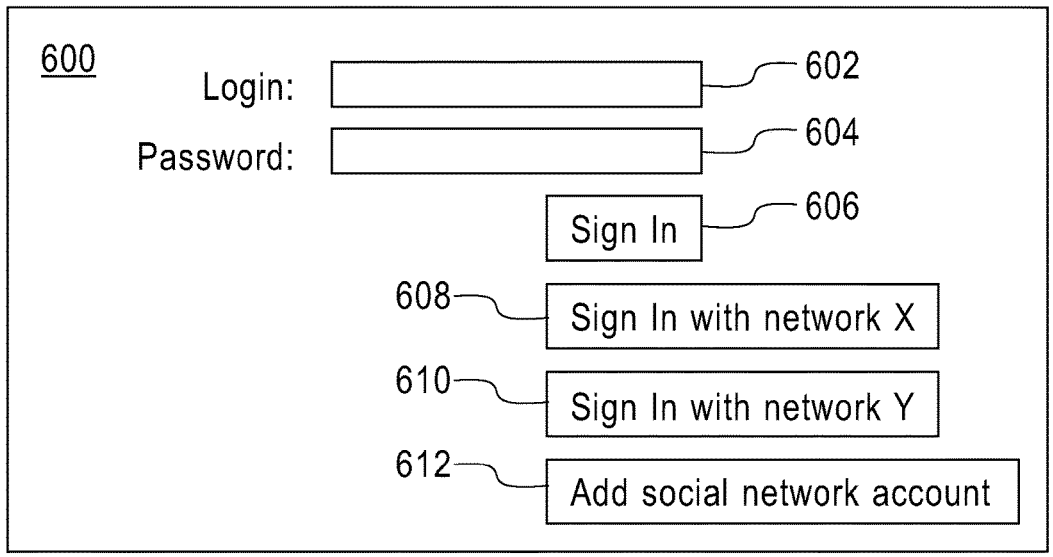
FIGS. 6-8 are graphical user interfaces according to an embodiment of the present disclosure.

With reference now to FIGS. 6-9, example user interfaces that may be provided by system 100 to implement the methods described herein in system 100. With reference to FIG. 6, user interface 600 includes a login field 602 and a password field 604 configured for receiving user credentials to login or access system 100. The user may log into system 100 with the user credentials input into login file 602 and password field 604 by activating a "sign in" element 606. In some embodiments, login field 602 and password field 604 may also be configured to receive the user's login and password to the user's social media account. For example, the user may sign into a social network X by activating an element 608 and may sign into social network Y by activating an element 610. An element 612 may be activated by the user to add additional elements to allow the user to log in to one or more additional social networks.

Figure 7:
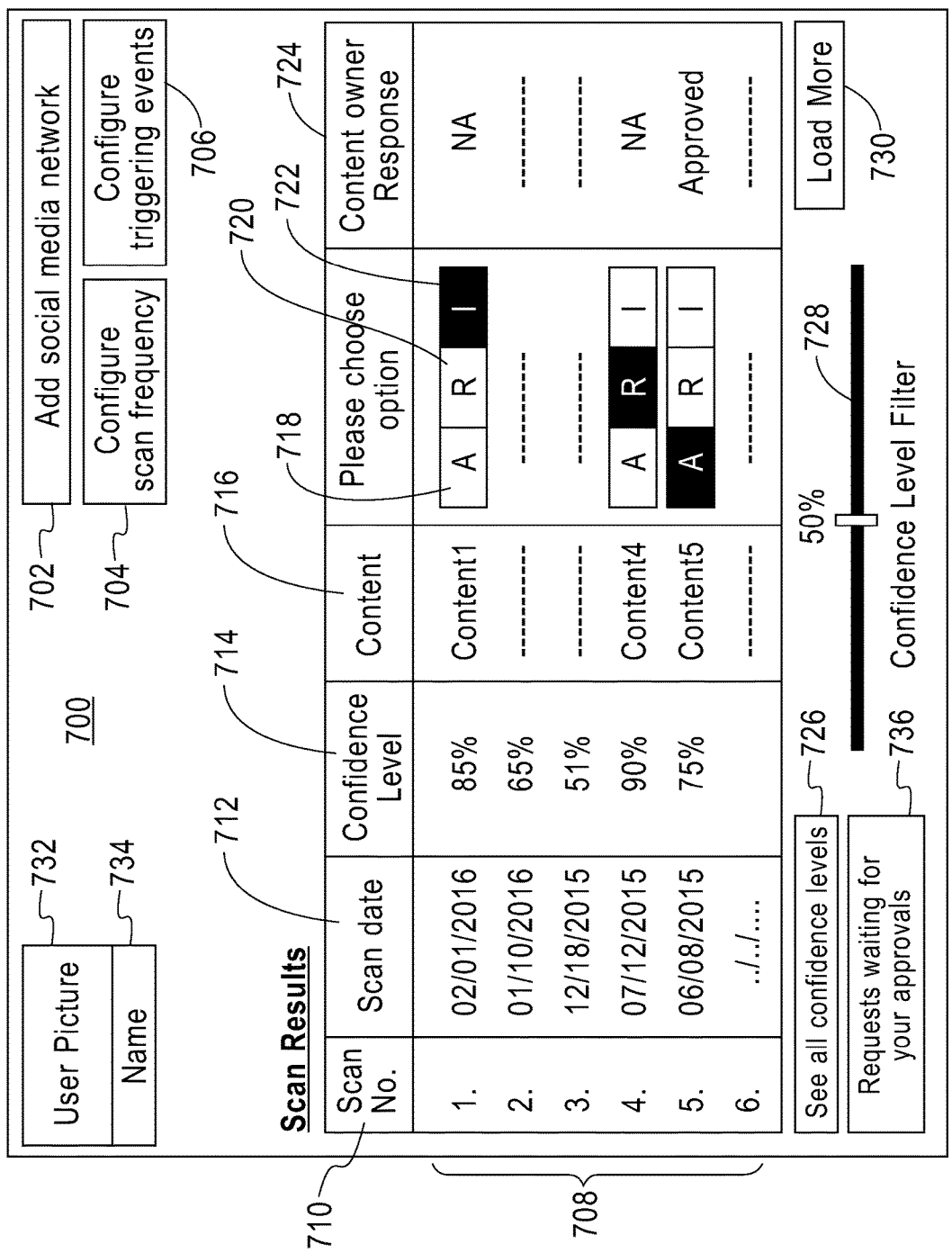
Figure 8:
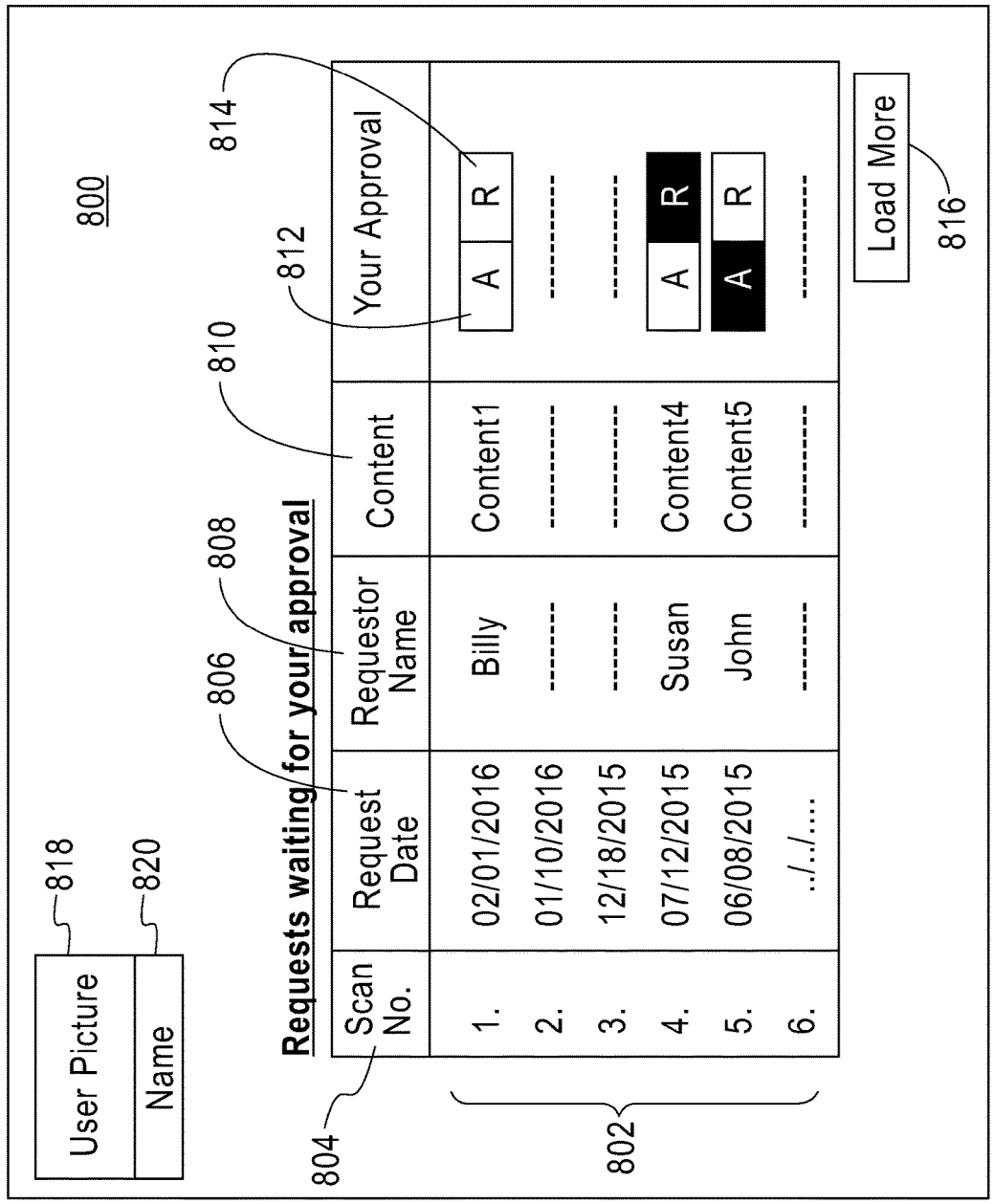

With reference now to FIG. 7, a user interface 700 may be provided by system 100. For example, user interface 700 may be provided once the user has logged in. In some embodiments, user interface 700 includes an element 702 that may be activated by a user to add one or more social networks to a list of social networks that system 100 will search and/or analyze. In some embodiments, user interface 700 includes an element 704 that may be activated to adjust the frequency at which the social media networks will be scanned. For example, the user may set the scan frequency to e.g., hourly, daily, bi-weekly, weekly, bi-monthly, monthly, quarterly, semi-annually, annually, etc. In some embodiments, element 704 may also allow the user to set the scan frequency to none such that system 100 will not periodically scan the social media networks without some triggering event. In some embodiments, user interface 700 includes an element 706 that may be activated to set triggering events for scanning a social media network. For example, the user may set the triggering event to be any update to the users profile, any update to the users social contact list, any updates to friends profiles or contact lists, any update to a contact that the user is following, any update to a contact whose content the user has liked, or any other similar update or triggering event.

In some embodiments, user interface 700 also provides the user with scan results 708 including a scan number 710 indicating the number of a particular scan, a scan date 712 indicating a date on which a scan was performed, a indication 714 of the confidence level that system 100 has determined for each scan result, and an indication 716 of the content under consideration for each scan result. For example, the content itself may be provided, e.g., text, image, video, etc. In some embodiments an image or video may be embedded in results 708. In some embodiments the content may be provided as a link to the actual content as published. User interface 700 may also include accept, reject, and ignore elements 718, 720, and 722, respectively that are activatable by the user to accept, reject, or ignore a scan result. User interface 700 may include, for example, indications 724 for each result 708 of whether a response from an owner/publisher of the item of content 716 to a message sent by system 100 has been received. Indications 724 may include, for example, a response to a request for confirmation that the item of content 716 is about the user and/or a response to a request for permission to associate the item of content 716 with the user's profile. In some embodiments, no indication 724 may be present, for example, where no message was sent to the owner/publisher of the content. In some embodiments, indication 724 may be filled in with "NA", for example, where no confirmation or permission from an owner/publisher of content is required. In some embodiments, indication 724 may be filled with an indication that the user is waiting for a response from the owner/publisher of the item of content.

User interface 700 may also include filtering features such as, for example, an element 726 that is activatable to allow the user to see all scan results regardless of confidence level and an element 728 that is adjustable or activatable by a user to filter out all confidence levels below a user selected confidence level value. In some embodiments, for example, element 728 may be a slider.

In some embodiments, user interface 700 may include an element 730 that allows the user to load more scans. For example, element 730 may allow the user to view historic scans that are prior in time to the oldest scan currently displayed in user interface 700.

In some embodiments, user interface 700 may also include an image 732 of the user and an indication 734 of the user's name.

In some embodiments, user interface 700 may include an element 736 that is activatable by the user to view the user's currently pending requests. Activation of element 736 may cause system 100 to display a user interface 800 as illustrated, for example, in FIG. 8. User interface 800 provides a user of system 100 with the ability to review and accept or reject requests made by other users. For example, other users may request from the user of system 100 confirmation that an item of content owned or published by the user is about the other user. In addition, other users may request from the user of system 100 permission to associate content owned or published by the user with their profiles.

User interface 800 provides the user with requests 802 including a request number 804 indicating the number of a particular request, a request date 806 indicating a date on which a message including the request was received, a requester name 808 indicating a name of the user or entity that sent the message, an indication 810 of the content under consideration for the request, an accept element 812 activatable by the user to accept the request (confirm that the content is about the other user or give permission to use the content), and a reject element 814 activatable by the user to reject the request (confirm that the content is not about the other user, indicate that the user does not know if the content is about the other user, or reject permission to use the content).

In some embodiments, user interface 800 may include an element 816 that is activatable by the user to load more requests. For example, element 816 may allow the user to view requests that are prior in time to the oldest request currently displayed in user interface 800.

In some embodiments, user interface 800 may also include an image 818 of the user and an indication 820 of the user's name.

Although an example of user interfaces 600, 700, and 800 have been provided, system 100 may be implemented through any other similar user interfaces without departing from the scope of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   determining, by at least one processor, that a user's information on a social network has been updated, the user's information including profile information and social contact information of the user;
   in response to determining that the user's information has been updated, receiving, by at least one processor, the user's profile information and social contact information from the social network;
   processing the user's profile information, by at least one processor, to identify one or more items of content that are about the user;
   processing, by at least one processor, the user's social contact information to determine a plurality of contacts associated with the user;
   searching, by at least one processor, social media content associated with one or more of the plurality of contacts based on the identified items of content to identify additional content that may be about the user;
   determining, by at least one processor, a confidence level that the additional content is about the user;
   comparing, by at least one processor, the confidence level that the additional content is about the user to a pre-determined threshold;
   determining, by at least one processor, based on the comparison that the confidence level is above the pre-determined threshold; and
   in response to determining that the confidence level is above the pre-determined threshold, transmitting to at least one of a device of an owner of the additional content and a device of the user a request to confirm that the additional content is about the user;
   receiving from the at least one of the device of the owner and device of the user confirmation that the additional content is about the user; and
   in response to receiving confirmation that the additional content is about the user, transmitting to the device of the owner a request for permission to update the user's profile information to include the additional content; and
   updating, by at least one processor, the user's profile information to include the additional content based at least in part on the determination that the confidence level is above the pre-determined threshold and upon receiving from the device of the owner said permission to update the user's profile information to include the additional content.

2. The method of claim 1, wherein the profile information comprises at least one of an image and a video, wherein processing the profile information includes applying facial recognition processing to the image or video to generate face recognition data of the user.

3. The method of claim 2, wherein the social media content comprises at least one of an image and a video, the method further comprising:
   applying facial recognition processing to the image or video of the social media content to generate face recognition data of the image or video of the social media content;
   comparing the face recognition data of the image or video to the face recognition data of the user;
   based on the comparison, determining that the face recognition data of the image or video substantially matches the face recognition data of the user; and
   based on the determination that the face recognition data of the image or video substantially matches the face recognition data of the user, identifying the image or video as content that may be about the user.

4. The method of claim 1, wherein the confidence level that the additional content is about the user is determined based at least in part on at least one of a relationship of the user to the owner of the additional content and a context of the identification of the additional content.

5. The method of claim 4, further comprising:
   increasing the confidence level that the additional content is about the user for each identified item of content about the user that is associated with the additional content.

6. The method of claim 1, wherein transmitting to the device of the owner a request for permission to update the user's profile information to include the additional content includes:
   transmitting to the device of the user an indication that the additional content has been confirmed to be about the user;
   receiving from the device of the user an indication to request permission from the owner of the additional content; and
   transmitting to the device of the owner the request for permission.

7. The method of claim 1, wherein determining that the user's information on the social network has been updated is a determination that the user has joined the social network for the first time.

8. The method of claim 1, further comprising:
   iteratively performing the method of claim 1 each time the user's profile information is updated to include additional content.

9. A system comprising:
   at least one processor; and
   memory storing instructions that, when executed by the at least one processor, configure the system to perform a method to:
   determine that a user's information on a social network has been updated, the user's information including profile information and social contact information of the user;
   in response to determining that the user's information has been updated, receive the user's profile information and social contact information from the social network;

process the user's profile information to identify one or more items of content that are about the user;

process the user's social contact information to determine a plurality of contacts associated with the user;

search social media content associated with one or more of the plurality of contacts based on the identified items of content to identify additional content that may be about the user;

determine a confidence level that the additional content is about the user;

compare the confidence level that the additional content is about the user to a pre-determined threshold;

determine based on the comparison that the confidence level is above the pre-determined threshold; and in response to determining that the confidence level is above the pre-determined threshold, transmit to at least one of a device of an owner of the additional content and a device of the user a request to confirm that the additional content is about the user;

receive from the at least one of the device of the owner and device of the user confirmation that the additional content is about the user; and in response to receipt said confirmation that the additional content is about the user, transmit to the device of the owner a request for permission to update the user's profile information to include the additional content; and update the user's profile information to include the additional content based at least in part on the determination that the confidence level is above the pre-determined threshold and upon receipt from the device of the owner said permission to update the user's profile information to include the additional content.

10. The system of claim 9, wherein the profile information comprises at least one of an image and a video, wherein processing the profile information includes applying facial recognition processing to the image or video to generate face recognition data of the user.

11. The system of claim 10, wherein the social media content comprises at least one of an image and a video, the instructions, when executed by the at least one processor further configuring the system to:

apply facial recognition processing to the image or video of the social media content to generate face recognition data of the image or video of the social media content;

compare the face recognition data of the image or video to the face recognition data of the user;

based on the comparison, determine that the face recognition data of the image or video substantially matches the face recognition data of the user; and based on the determination that the face recognition data of the image or video substantially matches the face recognition data of the user, identify the image or video as content that may be about the user.

12. The system of claim 9, wherein the confidence level that the additional content is about the user is determined based at least in part on at least one of a relationship of the user to the owner of the additional content and a context of the identification of the additional content.

13. The system of claim 12, wherein the instructions, when executed by the at least one processor further configuring the system to:

increase the confidence level that the additional content is about the user for each identified item of content about the user that is associated with the additional content.

14. The system of claim 9, wherein transmitting to the device of the owner a request for permission to update the user's profile information to include the additional content includes:

transmitting to the device of the user an indication that the additional content has been confirmed to be about the user;

receiving from the device of the user an indication to request permission from the owner of the additional content; and transmitting to the device of the owner the request for permission.

15. The system of claim 9, wherein determining that the user's information on the social network has been updated is a determination that the user has joined the social network for the first time.

16. The system of claim 9, wherein the instructions, when executed by the at least one processor further configuring the system to:

iteratively perform the method of claim 9 each time the user's profile information is updated to include additional content.

17. A computer readable medium storing instructions that, when executed by at least one processor, configure the at least one processor to:

determine that a user's information on a social network has been updated, the user's information including profile information and social contact information of the user;

in response to determining that the user's information has been updated, receive the user's profile information and social contact information from the social network;

process the user's profile information to identify one or more items of content that are about the user;

process the user's social contact information to determine a plurality of contacts associated with the user;

search social media content associated with one or more of the plurality of contacts based on the identified items of content to identify additional content that may be about the user;

determine a confidence level that the additional content is about the user;

compare the confidence level that the additional content is about the user to a pre-determined threshold;

determine based on the comparison that the confidence level is above the pre-determined threshold; and in response to determining that the confidence level is above the pre-determined threshold, transmit to at least one of a device of an owner of the additional content and a device of the user a request to confirm that the additional content is about the user;

receive from the at least one of the device of the owner and device of the user confirmation that the additional content is about the user; and in response to receipt said confirmation that the additional content is about the user, transmit to the device of the owner a request for permission to update the user's profile information to include the additional content; and update the user's profile information to include the additional content based at least in part on the determination that the confidence level is above the pre-determined threshold and upon receipt from the device of the owner said permission to update the user's profile information to include the additional content.

18. The computer readable medium of claim 17, wherein determining that the user's information on the social network has been updated is a determination that the user has joined the social network for the first time.

\* \* \* \* \*